United States Patent [19]
Chenock, Jr.

[11] Patent Number: 5,344,515
[45] Date of Patent: Sep. 6, 1994

[54] METHOD OF MAKING A PUMP HOUSING

[75] Inventor: Thomas A. Chenock, Jr., Willoughby, Ohio

[73] Assignee: Argo-Tech Corporation, Cleveland, Ohio

[21] Appl. No.: 24,407

[22] Filed: Mar. 1, 1993

[51] Int. Cl.⁵ .................................................. B65H 81/00
[52] U.S. Cl. ............................ 156/171; 156/173; 156/175; 415/197
[58] Field of Search ............... 415/197; 156/173, 175, 156/169, 174, 171

[56] References Cited

U.S. PATENT DOCUMENTS

| | | | |
|---|---|---|---|
| 1,232,110 | 7/1917 | Sloper | 156/173 X |
| 3,210,228 | 10/1965 | Bluck | 156/173 X |
| 3,414,449 | 12/1968 | Beach | 156/173 |
| 3,607,600 | 9/1971 | Schreter et al. | |
| 4,193,829 | 3/1980 | Kourtides et al. | |
| 4,631,335 | 12/1986 | Scola et al. | |
| 4,684,423 | 8/1987 | Brooks | 156/174 X |
| 4,776,760 | 10/1988 | Grisz | |
| 4,921,557 | 5/1990 | Nakamura | 156/173 X |
| 5,004,513 | 4/1991 | Bemis et al. | |
| 5,007,343 | 4/1991 | Marks | 156/173 X |
| 5,219,461 | 6/1993 | Hyll et al. | 415/197 |

FOREIGN PATENT DOCUMENTS 702533  1/1965  Canada .............................. 156/173

Primary Examiner—Jeff H. Aftergut
Attorney, Agent, or Firm—Fay, Sharpe, Beall, Fagan, Minnich & McKee

[57] ABSTRACT

A method of forming a polymer composite fuel pump housing is provided. The method calls for the application of an elastomeric material onto a mandrel surface to create a substantially continuous elastomeric layer thereon. A fiber-reinforced resin layer is added to the elastomeric layer. The application of the fiber-reinforced resin layer is accomplished by either autoclave or resin transfer molding (RTM). The fiber-reinforced layer and elastomeric layer are then subjected to curing and the mandrel is removed. The resulting fuel pump housing comprises a leak and abrasion resistant elastomeric liner bonded to the fiber-reinforced resin layer.

10 Claims, 2 Drawing Sheets

METHOD OF MAKING A PUMP HOUSING

BACKGROUND OF THE INVENTION

The present invention is directed to the art of composite pump housings, and more specifically to the art of making composite pump housings through lamination techniques.

The invention is especially applicable to producing vessels such as fuel pump housings, and will be described with reference thereto. It will be appreciated, however, that the invention has broader application, and can be implemented in connection with fabricating other types of pressure or fluid containing vessels.

Fuel pump housings comprised of polymeric composites have been known in the art. While these composite housings are desirable for the strength and relative lightness in weight they offer compared to their metal counterparts, a number of problems are attributable to their construction. For example, it is quite commonplace for microcracks to develop in polymer composites used in high pressure and high temperature situations. Although such microcracks do not substantially reduce structural strength of the pump unit, they do lead to undesirable fuel leakage through the housing structure. In addition, the internal surfaces of existing composites tend to erode as a result of contaminants such as sand, dust, cotton fibers and other materials which pass through voids or inner workings defined by the pump housings. This results in inefficiencies associated with the use of composite centrifugal fuel pumps.

As a result of the above and other problems with existing polymer composites, it has become desirable to develop a fuel pump housing that is strong and lightweight, and provides for a tight seal against fuel leakage.

It has become further desirable to develop a polymeric composite fuel pump housing that is resistant to erosion and abrasion resulting from foreign materials that attack the composite.

It has become still further desirable to develop a method for making a polymeric composite fuel pump housing that is lightweight and strong, seals against fuel leakage, and resists erosion and abrasion.

The present invention contemplates a new and improved product and method which overcomes all of the above referenced problems and others. It provides for a strong, lightweight polymeric composite fuel pump housing which seals against fuel leakage while resisting abrasion and erosion during use, and a method for making the same.

BRIEF DESCRIPTION OF THE INVENTION

In accordance with the present invention, there is provided a method for producing a polymeric composite vessel which prevents fuel leakage as well as erosion and abrasion. The polymeric composite is processed by either autoclave or resin transfer molding (RTM).

In accordance with a more limited aspect of the invention, a method of forming a vessel calls for applying an elastomeric material onto a mandrel surface to create a substantially continuous elastomeric layer thereon. A fiber reinforced resin layer is added to the elastomeric layer. The fiber reinforced resin layer may be applied according to an autoclave process or an RTM process. In the autoclave process, fiber reinforced resin prepreg is applied to the elastomer. The prepreg assembly is then vacuum bag sealed with materials and methods known in the art. The vacuum bag is ducted to low pressure to provide the evacuation of air or trapped gases and to allow the flow of resin within the prepreg. After bagging and applying vacuum, the assembly is placed in an autoclave where pressure and heat is applied by inert gas to the exterior of the vacuum bag assembly to result in higher differential pressure and controlled temperature of the assembly. In the RTM process, dry fiber fabric is applied to the elastomer to create a preform which is inserted into an RTM mold, followed by injection of resin into the dry fabric. The fiber reinforced layer and elastomeric layer are subjected to curing, and the mandrel is then removed.

In accordance with another aspect of the invention, the vessel which results from the above processes comprises a leak resistant elastomeric liner as well as a fiber-reinforced resin layer bonded to the elastomeric liner.

A principal advantage of the invention is that it provides for a light weight composite vessel which is sealed against leakage and protects against abrasion and erosion.

Another advantage of the present invention lies in the method of manufacture. As a result of the lamination techniques employed, the resulting vessel offers the above-mentioned benefits of leakage, erosion and abrasion protection.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof.

DETAILED DESCRIPTION OF THE PREFERRED EMBODIMENT

Figure 2:
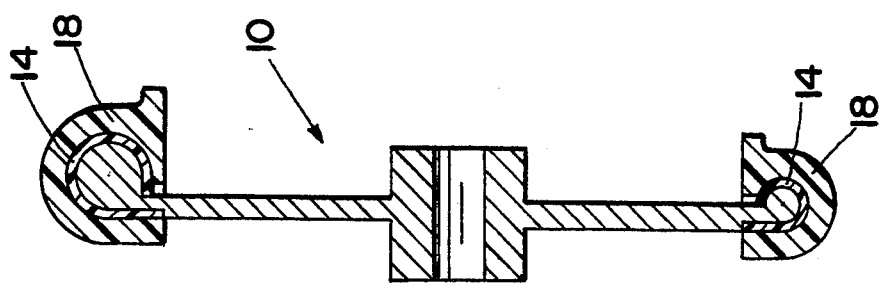
FIG. 2 is a cross section of a pump housing taken generally along line 2—2 of FIG. 1.

The present invention is directed to a method for making a lined polymeric composite vessel such as a fuel pump housing. The resulting housing is sealed against fluid leakage and resists abrasion. The process can, of course, be used in forming a variety of other parts and components such as other types of pressure vessels and fluid containment vessels.

In preparing the lined polymeric composite, an expendable mandrel is used as a core or mold for the resulting part. The mandrel is in the shape of the inner void surface of the part to be made, and the interior dimensions of the part are substantially equivalent to the exterior dimensions of the mandrel. The mandrel may be comprised of a metal, ceramic or other suitable material. For example, the mandrel may be comprised of a eutectic alloy such as a tin-silver alloy, or a eutectic salt such as a nitrate-nitrite.

An elastomeric material is applied onto the mandrel surface to create a substantially continuous elastomeric layer thereon. The elastomer is typically a B-staged sheet material obtained in bulk sheet form or in precut patterns. The sheet is wrapped around the mandrel in a single layer to obtain a substantially continuous layer thereon. Examples of suitable elastomers preferably include fluorocarbon rubber such as the Viton fluoroelastomer of E. I. dupont de Nemours & Co., Inc., (i.e., a vinylidene fluoride-hexafluoropropylene copolymer) although others, such as, but not limited to, butadiene acrylonitrile copolymer (Buna-N), or ethylene propylene rubber (EP) may be used. Selection of an appropriate elastomer depends upon the temperature and environmental conditions required. For example, the V8560 Viton fluorocarbon as supplied by Torr Technologies may be used at desirable operating temperatures of around 350° F. or higher, while the nitrile rubber (e.g., butadiene acrylonitrile copolymer) and ethylene propylene rubber may be used at about 250° F.

The V8560 Viton fluoroelastomer of Torr Technologies is preferred herein. It is available in a black color and has a smooth finish. The fluoroelastomer, as an O-ring seal, may withstand temperatures in a range of −10° to 500° F., and is resistant to chlorinated solvents, aliphatic and aromatic hydrocarbons, oil, fuels, ozone, weather, lubricants, and animal or vegetable oils. The material is further recognized by the following additional specifications at room temperature:

| | |
|---|---|
| Durometer (Shore A) | 72 |
| Tensile (psi) | 1600 |
| Elongation at break (%) | 200 |
| Tear (PPI) | 115 |
| Specific Gravity | 1.88 |
| Compression Set (%) 22 hrs. [@ 347° F.] | 35 |

As stated, patterns of the elastomeric sheet at thicknesses of 1/32–1/16" (±0.005") are layed-up onto the metal or ceramic mandrel surface to create a continuous rubber layer. One, two or more plies of the rubber may be applied. It is preferable that the rubber of a single ply does not overlap with itself in order to avoid wrinkling and air pocket formation during subsequent processing steps. An advantage of using B-staged Viton as the liner is that it will bond against itself during cure in areas where seams or splice joints occur. Thus, potential leakage paths are avoided. Moreover, the fluorocarbon rubber offers a higher temperature resistance over the nitrile and ethylene propylene rubbers.

Once the elastomeric sheet or sheets have been layed-up onto the mandrel, the elastomer is semi-cured by the application of heat and pressure. During cure of the fluorocarbon elastomer, condensation by-product gases are produced. In this regard, the elastomer-coated mandrel is subjected to vacuum pressure (29 in. Hg) within a sealed vacuum bag. Within the bag are breather and peel plies that are layered on top of the entire elastomer and tool surface. After a period of around 30 minutes in vacuum, the part is placed into an autoclave at room temperature, ready for cure. An external gauge pressure of 50–200 psi is then applied to the elastomer, with an appropriate pressure being determined by the particular elastomer used. For example, application of an external pressure of about 85 psig has been determined to be appropriate when the elastomer is the V8560 fluorocarbon of the preferred embodiment.

The liner and mandrel are heated to cure temperatures in a range of about 100°–420° F., preferably 250°–410° F., at a ramp rate of roughly 1° or 2° to 10°–15° F./min., preferably 8° to 10° F./min. In a preferred embodiment, when V8560 fluorocarbon rubber is used, an appropriate cure temperature is about 350° F.

Selection of an appropriate ramp rate is important. If the temperature ramp rate is too great, i.e. significantly greater than 15° F./min., there is a possibility that thermal cracks will appear in the mandrel or otherwise. Slower ramp rates are most desirable in resisting thermal cracking, but significantly add to the expense of the process. The range of 8° to 10° F./min. appears to be the most economical rate which resists causing harm or damage during the process.

The elastomer-coated mandrel is maintained at its cure temperature for about 2–6 hours. Thereafter, the assembly is permitted to cool under pressure to a reasonably low temperature to avoid quick cooling, generally about 160° F. or lower. The assembly is then removed from the autoclave and exposed to ambient conditions, i.e., room temperature and pressure. At this point, the rubber is semi-cured.

The semi-cured elastomer-coated mandrel is then cooled down to room temperature. Thereafter, the process of adding a fiber-reinforced resin to the elastomeric layer begins. This step may be accomplished by using prepreg lay-up or dry fiber-reinforcement.

Prepreg lay-up comprises use of fiber sheets which are previously impregnated with resin. The preferred material used herein is a BASF 5250-4 prepreg comprising carbon fibers impregnated with bismaleimide resin. This material is available from BASF Structural Materials, a subsidiary of BASF Corporation.

The 5250-4 prepreg material is almost completely cured after 6 hours at 350° F., although complete cure and high Tg (glass transition temperature) are both achieved by postcuring at 460° F. for 10–11 hours.

The prepreg is generally a slightly tacky material. The fibers in a particular sheet of prepreg can be oriented in one, two or a multitude of directions. The one directional fiber form of the sheet prepreg is known in the art as unidirectional tape. The multidirectional fiber forms of the sheet prepreg are known as woven fabrics, with the most common, and preferred type used herein, as biaxial. Dry fiber reinforcement calls for sheets of fiber to be arranged and later injected with resin according to the RTM process.

In the case where the fiber-reinforced resin is to be prepreg, multiple sublayers of prepreg are applied to the elastomeric layer according to a quasi isotropic planar layup format, the preferred layup in this embodiment. In the first sublayer of prepreg applied to the elastomer, the fibers are said to be oriented at a base of 0°. The 0° axis of unidirectional fiber prepreg coincides with the fiber orientation. The 0° axis of woven prepreg is defined herein as the fiber direction most parallel to the direction of the prepreg as it is dispensed from the roll. This 0° axis, for woven fabrics, is also known in the art as the "warp" axis. The "fill" axis is oriented 90° and corresponds to the second direction of fiber orientation for biaxial fabric.

A second prepreg sublayer is applied over the first with the fibers this time being oriented at +45° relative to the 0° degree axis in the first sublayer. A third sublayer of prepreg is applied onto the second sublayer with the orientation of the fibers being −45° relative to the first sublayer. In the fourth sublayer of prepreg, the fibers are oriented at 90° relative to the first sublayer. This rotation of fiber orientation, or one similar to it, is repeated for each subsequent sublayer of prepreg that is applied. In the preferred embodiment, the resulting laminate is constructed to have midplane symmetry for the sequences of angular orientation.

Any number of prepreg sublayers with various orientation angles may be applied. The appropriate number and orientations is typically determined by the strength (static or fatigue basis), stiffness or other mechanical and physical property requirements of the resulting component part, i.e. pump housing. In the preferred embodiment, thirty-two (32) sublayers or plies of prepreg are applied, with midplane symmetry of the layup occurring between sublayers 16 and 17.

After application of every two to four plies, the prepreg lay-up is subjected to a debulking cycle. After the final ply is applied, the assembly is bagged for molding and subjected to curing in an autoclave.

In the case for RTM processing, sheets of dry fiber fabric, preferably carbon fibers, are layered onto the elastomer-coated mandrel surface. The sheets of dry fabric are applied according to quasi isotropic planar lay-up similar to that of the prepreg. Thirty-two (32) sublayers of such dry fabric fiber are applied in the preferred embodiment. Once the requisite number of sublayers is applied (i.e. thirty-two (32) in a preferred embodiment), the entire assembly is placed in a closed mold. A vacuum is pulled in the mold, and resin is injected into the dry fabric.

The in-plane quasi isotropic layup used in a preferred embodiment of the present invention is described by the following notation:

$$[([0, +45, -45, 90]_s)_s]_s$$

wherein "s" is defined as symmetry (or mirror plane). With respect to the laminate of the present invention, midplane symmetry for the total 32 ply layup occurs between plies 16 and 17. The following table lists the orientation of the fibers for the various plies:

| Ply # | Θ° |
|---|---|
| 1 | 0 |
| 2 | +45 |
| 3 | −45 |
| 4 | 90 |
| 5 | 90 |
| 6 | −45 |
| 7 | +45 |
| 8 | 0 |
| 9 | 0 |
| 10 | +45 |
| 11 | −45 |
| 12 | 90 |
| 13 | 90 |
| 14 | −45 |
| 15 | +45 |
| 16 | 0 |
| 17 | 0 |
| 18 | +45 |
| 19 | −45 |
| 20 | 90 |
| 21 | 90 |
| 22 | −45 |
| 23 | +45 |
| 24 | 0 |
| 25 | 0 |
| 26 | +45 |
| 27 | −45 |
| 28 | 90 |
| 29 | 90 |
| 30 | −45 |
| 31 | +45 |
| 32 | 0 |

The above layup was chosen in the preferred embodiment for several reasons. First of all, the above layup pattern minimizes microcrack formation. Adjacent 0° to 90° plies are known to induce microcracks and were avoided herein. Ply nesting is to be used to keep ply symmetry when using harness satin weave fabrics other than plain weave types. In addition, inplane quasi-isotropic layup insures elastic properties to be equal in all directions, i.e., $E_{0°}=E_{45°}=E_{90°}$ (wherein $E_\Theta$=stiffness or modulus); and $\nu_{0°}=\nu_{90°}$ (wherein $\nu_{73}$=Poisson's ratio). Furthermore, laminate midplane symmetry is created to decouple the bending and extension constitutive relations so that bending moments and extensional forces can be analyzed separately. Finally, the above layup meets both stiffness and strength requirements with 30 to 50% weight savings over cast aluminum.

After the fiber-reinforced layer has been applied by either the prepreg or dry fiber reinforcement method, the composite structure is subjected to the curing temperatures and pressures appropriate for the particular composite resin used. The curing step serves to crosslink the resin and consolidate the solid base composite. Cure of the composite also finalizes cure of the elastomer, i.e., in situ final curing of the elastomer.

In the dry fiber reinforcement method which calls for resin transfer molding, the cure takes place under low pressure in a closed mold or heated tool. The resin is fed into the heated mold from a pressure pot and injected into the fabric. It permeates and fills the voids in the interstitial spaces. More heat is added once the mold is filled with resin. The resin is cured in the mold at appropriate temperatures and pressure. The mold is then pulled apart to remove the resulting part.

When prepreg is used for building up the vessel body, conventional steps known in the art are used for curing. These, however, involve bagging procedures where Kapton or Teflon release film and glass fabric is applied to the structure so air and volatiles (i.e., gases) can be exhausted. The flow of gases from the bag is accomplished by differential pressure of the autoclave and the internal bag. This differential pressure also results in flow and compaction of the resin in the plies. It is important to exhaust the gases and consolidate the resin to prevent the occurrence of voids within the wall or walls of the structure. The autoclave pressure also helps to dissolve entrained gases into the liquid resin. Next, a nylon or Kapton bag is sealed around the structure and vacuum is applied to the interior of the bag. Thereafter, the bagged assembly is cured in an autoclave at temperatures and pressures appropriately chosen corresponding to the resin type. The semi-cured elastomeric liner is "in situ" final cured along with the primary cure of the thermoset prepreg material.

In a preferred embodiment, bismaleimide (BMI) is the resin used. For this particular resin, the cure temperature is 350° F. The ramp rate is 2°-5° F./min. and the cure temperature is maintained for 8 hours.

In both the autoclave and RTM methods of curing, the rubber liner is bonded directly to the composite resin without the use of secondary adhesives. Also, the cure of the rubber liner is finalized.

Once the assembly has been fully cured, the mandrel is removed leaving the elastomer bonded to the internal surface of the composite pump structure. The elastomeric seal coating maintains leak tightness and prevents erosion of the composite base structure. If necessary, the rubber lined pump structure can be post cured. For example, the lined composite part may be subjected to a post-cure cycle at appropriate temperatures and pressures. In the preferred embodiment, the cycle calls for an ambient pressure post-cure at 460° F. for 8-10 hours for bismaleimide, and at 350° F. for 4 hours for epoxies. Here again, post cure temperatures are relative to the composite resin used.

In a preferred embodiment of the present invention, the fibers in either the prepreg or dry fiber reinforcement comprise carbon fibers. Of course, other fibers, such as glass and Kevlar, could likewise be used.

The resin which is included in the prepreg or injected into the dry fiber reinforcement is a thermosetting type. Examples of appropriate materials include, but are not limited to, polyesters, epoxies, urethanes, phenolics, thermosetting polyimides and benzocyclobutene (BCB) thermosets. The choice of resin polymer is also dependent on the viscosity and process temperatures. This invention does not exclude thermoplastics since technological breakthrough could similarly occur to result in low viscosity for these materials at temperatures near 350° F.–400° F. In the preferred embodiment, however, bismaleimide (BMI) is the resin of choice.

Figure 1:
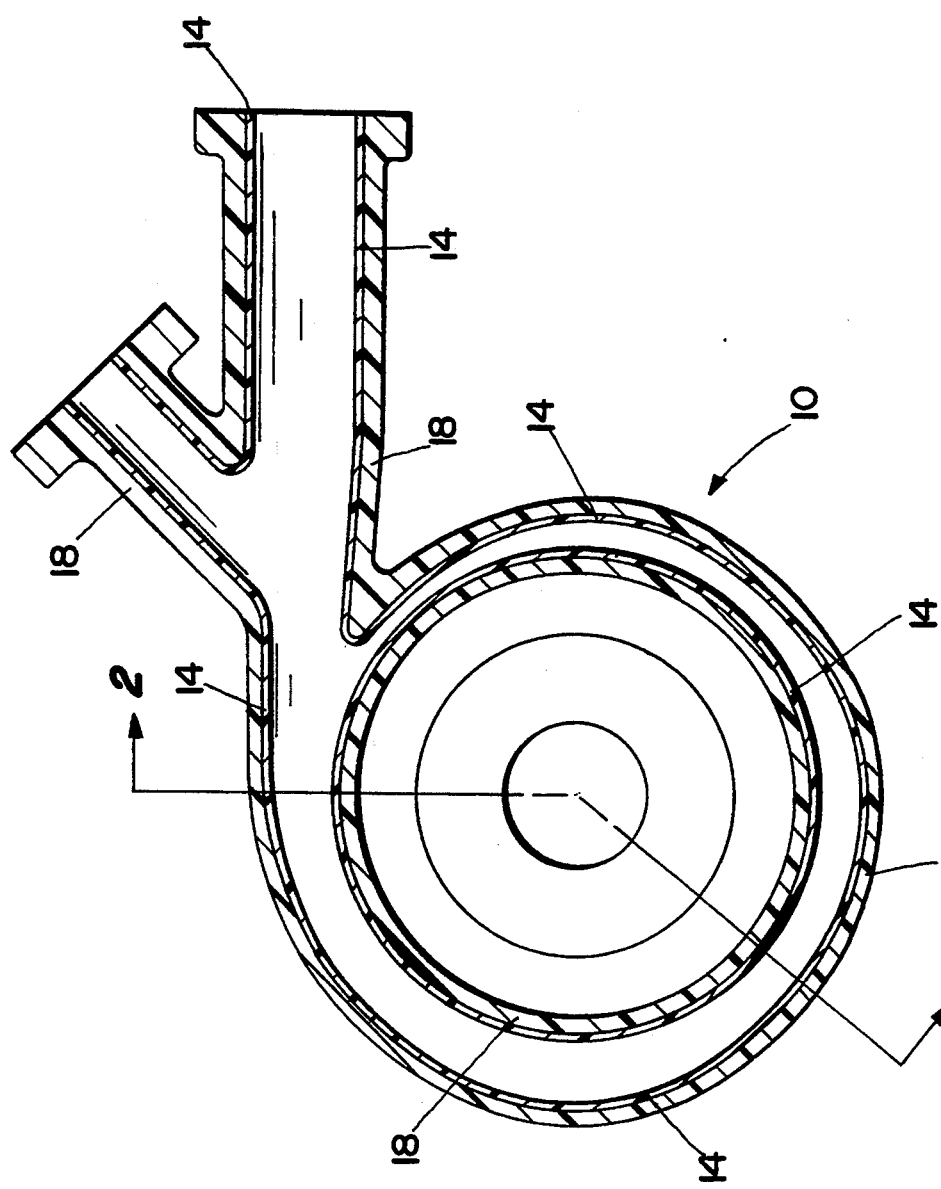
FIG. 1 shows a cross section of a pump housing formed in accordance with the method of the present invention.

With attention now to FIGS. 1 and 2, a typical composite pump housing formed in accordance with the method of the present invention is shown. The pump housing 10 is shown in cross-section to depict the various layering or lamination techniques used in forming the composite structure. An interior wall 14 of the structure is comprised of an elastomer, preferably fluorocarbon rubber. This wall 14 forms the interior lining of the pump structure and lines the pump's various wetted surfaces. The remaining portion is comprised of a fiber-reinforced resin layer 18. Any number of sublayers can be applied, although in a preferred embodiment thirty-two (32) sublayers of fiber-reinforced resin comprise the body of the pump housing. The fibers are arranged in a quasi isotropic planar lay-up with midplane symmetry. It should be noted that if any microcracks occur in the pump housing body 18, lining 14 prevents any fuel or other fluid within the pump unit from leaking through the body. The resulting structure can be machined to smoothen out selected surfaces or to create high tolerance dimensions.

Figure 3:
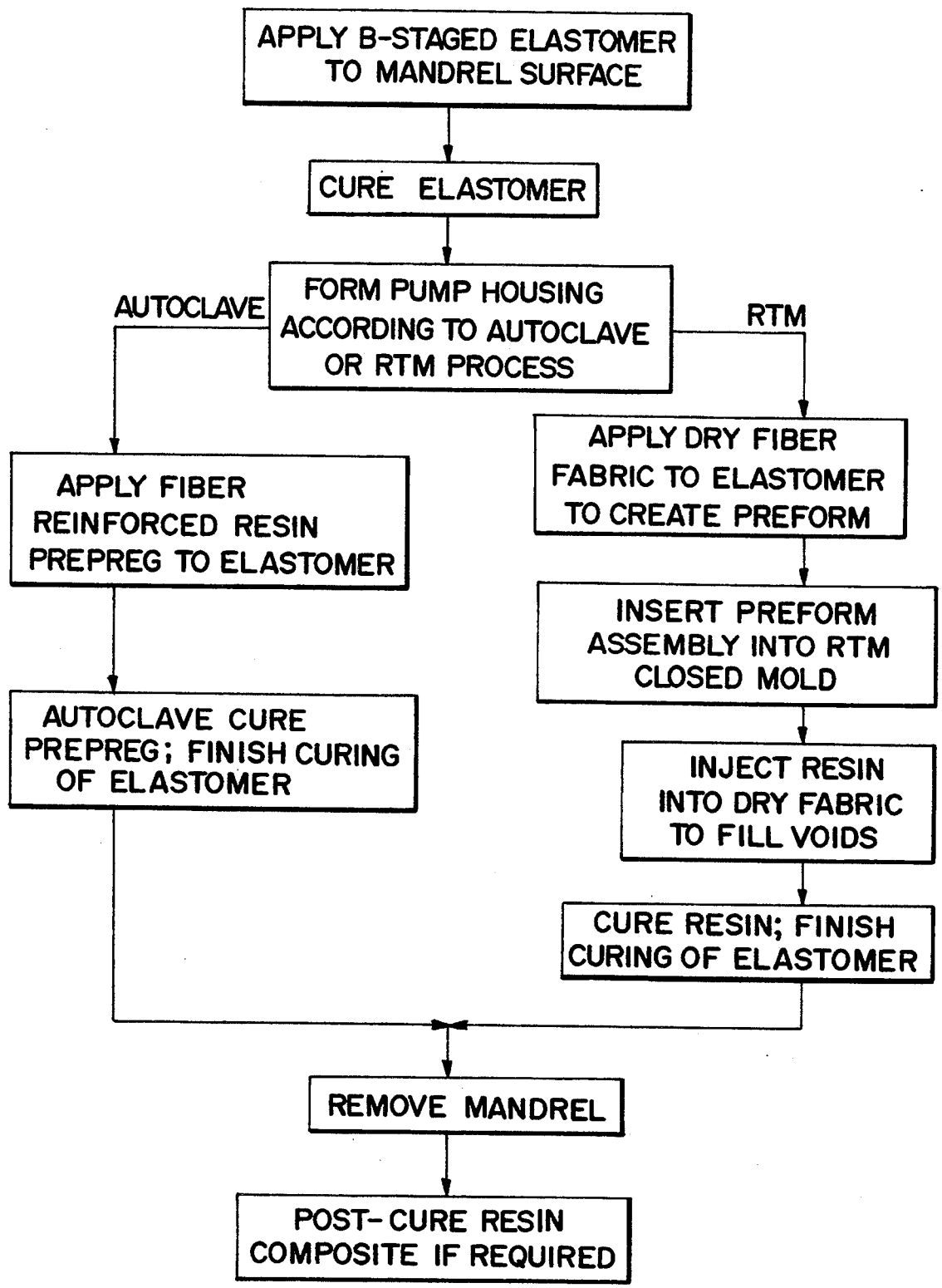
FIG. 3 is a flow diagram showing the sequence of steps used in practicing the method of the present invention.

FIG. 3 is a flow diagram showing the sequence of steps followed in the method of the present invention. The general steps of the invention are shown. These include applying a B-staged elastomer to a mandrel surface, curing the elastomer, forming a fiber-reinforced resin composite pump housing according to an autoclave or RTM process, removing the mandrel, and post-curing. The autoclave process calls for application of fiber reinforced resin prepreg to the elastomer, followed by autoclave curing of the prepreg, at which time curing of the elastomer is completed. The RTM process calls for application of a dry fiber fabric to the elastomer to create a preform, and inserting the preform assembly into an RTM closed mold. Resin is injected into the dry fabric to fill the voids. Thereafter, the resin is subjected to curing, with curing of the elastomer being completed.

It is to be noted that the adhesion of the elastomeric liner material to the fiber-reinforced resin pump housing body is accomplished without the use of secondary adhesives. The elastomeric liner bonds readily to the resin in the composite fiber-reinforced material. Fibers are not used to bond the resin to the elastomer. Moreover, it should be noted that the B-stage elastomeric material used as the liner offers strong self adhesion during lay-up onto the expendable mandrel.

The resulting rubber lined pump structure is a high-structural high-pressure pump wherein the lining is bonded to the reinforced composite material to provide a seal against fuel leakage as well as a barrier against erosion.

The invention has been described with reference to the preferred embodiment. Obviously, modifications and alterations will occur to others upon a reading and understanding of this specification. It is intended to include all such modifications and alterations insofar as they come within the scope of the appended claims or equivalents thereof.

I claim:

1. A method of forming a lined pump housing, comprising the steps of:
   applying a sheet of B-staged elastomeric material onto a mandrel surface to create a continuous lining layer thereon;
   subsequently drawing a vacuum over the B-staged elastomeric material;
   subsequently heating the B-staged elastomeric material to an appropriate curing temperature to semi-cure the elastomer;
   subsequently applying a fiber-reinforced resin layer comprising a prepreg sheet of fiber previously impregnated with resin on the semi-cured elastomer;
   simultaneously curing the fiber-reinforced resin layer and completing the cure of the elastomeric layer;
   bonding the fiber-reinforced layer to the elastomeric layer; and
   removing the mandrel.

2. A method of forming a lined pump housing, as set forth in claim 1 including the additional steps of:
   pressurizing the elastomeric layer to an appropriate external gauge pressure; and
   cooling the elastomeric layer to a temperature lower than the curing temperature and greater than ambient temperature at a ramp rate of 1°–15° F./minute.

3. A method of forming a lined pump housing, as set forth in claim 1, wherein the elastomeric material is a fluorocarbon.

4. A method of forming a lined pump housing, as set forth in claim 1, wherein the elastomeric material is a nitrile rubber.

5. A method of forming a lined pump housing, as set forth in claim 1, wherein the elastomeric material is an ethylene propylene rubber.

6. A method of forming a lined pump housing, as set forth in claim 1, wherein the fiber-reinforced resin layer is comprised of a thermoset or low viscosity thermoplastic matrix resin composite and fibers.

7. A method of forming a lined pump housing, as set forth in claim 6, wherein the fiber-reinforced resin layer is comprised of bismaleimide.

8. A method of forming a lined pump housing, as set forth in claim 1, wherein the fiber-reinforced resin layer is comprised of a member of the group consisting of polyesters, epoxies, urethanes, phenolics, thermosetting polyimides and benzocyclobutene (BCB) thermosets.

9. A method of forming a lined pump housing, as set forth in claim 1, wherein the fiber-reinforced resin layer includes carbon fibers therein.

10. A process for molding a lined composite pump housing, comprising the steps of:

applying a sheet of B-staged elastomer to a mandrel surface to create a substantially continuous elastomeric layer thereon;

semi-curing the elastomeric layer;

adding a fiber-reinforced resin to the semi-cured elastomeric layer;

curing the resin and the elastomeric layer; and removing the mandrel.

* * * * *